US007103602B2

(12) United States Patent
Black et al.

(10) Patent No.: US 7,103,602 B2
(45) Date of Patent: Sep. 5, 2006

(54) SYSTEM AND METHOD FOR DATA MANAGEMENT

(75) Inventors: Cameron Black, Burnsville, MN (US); Ross A. Schmidt, New Hope, MN (US); Sean M. Brockway, Minnetonka, MN (US); Robert M. Craig, Richfield, MN (US); Todd Partington, Shakopee, MN (US)

(73) Assignee: Kroll Ontrack Inc., Eden Prairie, MN (US)

( * ) Notice: Subject to any disclaimer, the term of this patent is extended or adjusted under 35 U.S.C. 154(b) by 470 days.

(21) Appl. No.: 09/944,712

(22) Filed: Aug. 31, 2001

(65) Prior Publication Data

US 2002/0059317 A1    May 16, 2002

Related U.S. Application Data

(60) Provisional application No. 60/229,874, filed on Aug. 31, 2000.

(51) Int. Cl.
*G06F 17/00* (2006.01)

(52) U.S. Cl. ...................................... 707/101
(58) Field of Classification Search ................ 707/200, 707/205, 10, 100–101, 202; 715/500
See application file for complete search history.

(56) References Cited

U.S. PATENT DOCUMENTS

| 5,608,874 | A | * | 3/1997 | Ogawa et al. ............... 707/201 |
| 5,732,265 | A | | 3/1998 | Dewitt et al. |
| 5,778,395 | A | * | 7/1998 | Whiting et al. ............. 707/204 |
| 5,813,009 | A | | 9/1998 | Johnson et al. |
| 5,848,415 | A | * | 12/1998 | Guck .......................... 707/10 |
| 5,974,412 | A | * | 10/1999 | Hazlehurst et al. ............ 707/3 |
| 6,020,980 | A | | 2/2000 | Freeman |
| 6,052,692 | A | | 4/2000 | Anderson et al. |
| 6,092,090 | A | * | 7/2000 | Payne et al. ................. 715/505 |
| 6,128,627 | A | | 10/2000 | Mattis et al. |

(Continued)

FOREIGN PATENT DOCUMENTS

JP        2001075890        3/2001

(Continued)

OTHER PUBLICATIONS

Merrill Corporation, "Introducing EFD, A faster, more cost-effective and reliable way to manage electronic evidence," 5 pages.

(Continued)

*Primary Examiner*—Jean Corrielus
*Assistant Examiner*—Anh Ly
(74) *Attorney, Agent, or Firm*—Merchant & Gould P.C.

(57) ABSTRACT

An automated data management system and method for logging, processing, and reporting a large volume of data having different file types, stored on different media, and/or run by different operating systems, includes a first server processor for restoring a plurality of received data files, the data files being capable of being different file types; a file organizing/categorizing processor for organizing the received data files, based on a predetermined user list, into a source directory structure and a destination directory structure; a file logging processor for logging the received data files into a database formed by the source and destination directory structures and identifying a file type of the received data files; a de-duplicate processor for calculating a SHA value of the received data files to determine whether the received data files have duplicates and flagging duplicated data files in the database; an image conversion processor for converting the remaining data files into image files, respectively; and a second server processor for exporting the image files.

16 Claims, 6 Drawing Sheets

U.S. PATENT DOCUMENTS

| | | |
|---|---|---|
| 6,192,165 B1 * | 2/2001 | Irons .................. 707/104.1 |
| 6,289,353 B1 | 9/2001 | Hazlehurst et al. |
| 6,389,433 B1 | 5/2002 | Bolosky et al. |
| 6,421,685 B1 * | 7/2002 | Nishikawa ................ 707/201 |
| 6,442,573 B1 * | 8/2002 | Schiller et al. .......... 715/500.1 |
| 6,547,829 B1 * | 4/2003 | Meyerzon et al. ....... 715/501.1 |
| 6,573,907 B1 | 6/2003 | Madrane |
| 2002/0059317 A1 | 5/2002 | Black et al. |
| 2002/0065892 A1 | 5/2002 | Malik |
| 2002/0107877 A1 | 8/2002 | Whiting et al. |
| 2002/0156827 A1 | 10/2002 | Lazar |
| 2003/0037022 A1 | 2/2003 | Adya et al. |

FOREIGN PATENT DOCUMENTS

| | | |
|---|---|---|
| WO | WO 98/18092 | 4/1998 |

OTHER PUBLICATIONS

Merrill/Executech, "New from Merrill/Executech . . . Electronic File Discovery (EFD)," 1 page.

Merrill Corporation, "Introducing EFD," 1 page.

Merrill Corporation, "Electronic File Discovery (EFD), " pp. 1 and 3-6.

Merrill/Executech, "Engagement Letter for EFD (Electronic File Discovery) Services," dated Mar. 31, 1999, 4 pages.

Image Database Construction Tools for Ricohbase, Y. Shirota et al., IEEE Pacific Rim Conference on Communications, Computers and Signal Processing, May 9-10, 1991, pp. 277-283, XP10039432.

Communications/Network Standards in the Textile Industry, Grady P.L. et al., Annual Textile, Fiber and Film Industry Technical Conference, Raleigh, NC, May 3-4, 1995, ISBN 07803-2689-X, pp. 1-6, XP10148546.

"Drop-In" publishing with the World Wide Web, J. Davis et al., Computer Netwroks and ISDN Systems, vol. 28, Nr. 1, pp. 247-255, North Holland Publishing, Amsterdam, NL, 1995, ISSN 0169-7552, XP4001231.

* cited by examiner

SYSTEM AND METHOD FOR DATA MANAGEMENT

This application claims the benefit of U.S. Provisional Application No. 60/229,874 filed Aug. 31, 2000, entitled SYSTEM AND METHOD FOR DATA MANAGEMENT, and which is in its entirety incorporated herewith by reference.

FIELD OF THE INVENTION

The present invention relates in general to a data management system and method, and more particularly, to an automated data management system and method for organizing and processing a large volume of various types of data files.

BACKGROUND OF THE INVENTION

With more and more information being stored electronically, it is found that the information is often stored in different formats, i.e., different types of files, on different storage media, or run by different operating systems. For example, some data may be stored in Microsoft Word format, some data may be stored in WordPerfect format, some data may be stored in Microsoft Excel format, and some data may be stored in a variety of email formats including, but not limited to, Microsoft Mail, Outlook, Group Wise, Lotus Notes, etc. Also, data may be stored in a hard drive, a floppy disk, a backup tape, a CD, or an optical device, etc. Further, data may be operated by a UNIX, NOVELL, NT, or DOS system, etc.

To review and/or manipulate any of these data that are stored in different file types, different media, run by different operating systems, a customer often needs to open/close the corresponding different software programs, such as Word, WordPerfect, Excel, Email Outlook, etc. This is a very inefficient way of reviewing and manipulating the stored data. Further, one has to have these software programs and their updated versions to review and/or manipulate the stored data.

In an area of litigation support, in particular, huge amount of documents and/or exhibits may have to be produced, organized, reviewed, reproduced, etc., for example, in merger and acquisition, intellectual property, anti-trust, and class action cases. The documents and/or exhibits may come from different locations in different file types. The existing methods of handling documents and/or exhibits include hand-coding or bar-coding. The hand-coding or bar-coding methods are not truly automated methods, and these methods are not efficient particularly in handling a volumetric amount of documents and/or exhibits.

Many litigation support companies often send out huge amounts of electronic documents to a third world developing country or hire scores of temporary workers. These workers would open documents, print documents, and enter information about a document by hand into an organized file. These methods are often time consuming, labor intensive, and prone to human mistakes. The sheer volume of data that one needs to review under strict discovery deadlines becomes a challenging and time demanding task. As a reviewer gathers electronic information, the reviewer is required to be confident that s/he has thoroughly searched, found, and reviewed all of the information residing on laptops, desktops, servers, and backup tapes, and sometimes in multiple locations.

Accordingly, there is a need for an efficient, automated data management system and method for organizing and processing a large volume of various types of data files.

It is with respect to these or other considerations that the present invention has been made.

SUMMARY OF THE INVENTION

In accordance with this invention, the above and other problems were solved by providing an efficient, automated data management system for logging, processing, and reporting a large volume of data capable of being in different types.

In one embodiment, a data management system in accordance with the principles of the present invention includes: a first server processor for restoring a plurality of received data files, the data files being capable of being different file types; a file organizing/categorizing processor for organizing the received data files, based on a predetermined user list, into a source directory structure and a destination directory structure; a file logging processor for logging the received data files into a database formed by the source and destination directory structures and identifying a file type of the received data files; a de-duplicate processor for calculating a SHA value of the received data files to determine whether the received data files have duplicates and flagging duplicated data files in the database; an image conversion processor for converting the remaining subset of de-duplicated data files into image files, respectively; and a second server processor for exporting the image files.

Still in one embodiment, the image files are stored in the database to be viewed.

Further in one embodiment, the image files converted from the data files are in a tiff format to be printed.

Yet in one embodiment, the data files include email data files and user data files. The email data files are in a variety of formats including, but not limited to, Microsoft Mail, Outlook, Group Wise, Lotus Notes, etc. The user data files have a variety of formats including Word, Excel, PowerPoint, and Access. The email data files may include attachment email or data files, which in turn may contain additional attachment or email files. The process is designed to handle an endless number of levels of embedded files Additionally in one embodiment, the attachment data and email files are associated with the email data files such that the image data files for the email data files and the corresponding attachment data and email files can be viewed together.

Still in one embodiment, the file logging processor, the image conversion processor, and the second server processor are parallel processors such that the data files are parallel-processed in a data file logging stage, an image conversion stage, and an image file output stage.

Further in one embodiment, the data files having the same file type are converted into the image files together.

Yet in one embodiment, the data management system includes a plurality of image conversion processors, each of the image conversion processors being capable of converting the data files having the same file type into the corresponding image files.

Additionally in one embodiment, the file logging processor identifies the file type of the data files based on the SHA value and a file header of each of the data files.

The present invention also provides a method of logging, processing, and reporting a large volume of data capable of being in different types.

In one embodiment, the method in accordance with the principles of the present invention includes the steps of: restoring a plurality of received data files, the data files being capable of being different file types; organizing/categorizing the received data files, based on a predetermined user list, into a source directory structure and a destination directory structure; logging the received data files into a database formed by the source and destination directory structures and identifying a file type of the received data files; de-duplicating duplicates in the received data files by calculating a SHA value of the received data files to determine whether the received data files have duplicates and flagging duplicated data files in the database; converting the remaining data files into image files, respectively; and exporting the image files.

Still in one embodiment, the method further includes the step of viewing the image files stored in the database.

Further in one embodiment, the converting of the data files includes tiffing the data files into the corresponding image files.

Yet in one embodiment, the identifying of the data files includes identifying email data files and user data files. The email data files are in a variety of formats including, but not limited to, Microsoft Mail, Outlook, Group Wise, Lotus Notes, etc. The user data files have a variety of formats including Word, Excel, PowerPoint, and Access. The email data files may include attachment data and email files.

Additionally in one embodiment, the method includes associating the email data files with the corresponding attachment data and email files such that the image data files for the email data files and the corresponding attachment data and email files can be viewed together.

Still in one embodiment, the method includes parallel processing the steps of logging, converting, and exporting such that the data files are parallel-processed in a data file logging stage, an image conversion stage, and an image file output stage.

Further in one embodiment, the converting of the data files includes converting the data files having the same file type into the image files together.

Yet in one embodiment, the converting of the data files is processed by a plurality of image conversion processors, each of the image conversion processors being capable of converting the data files having the same file type into the corresponding image files.

Additionally in one embodiment, the identifying of the file type of the data files is based on the SHA value and a file header of each of the data files.

One of the advantages of the present invention is that the data files are organized and processed in an efficient automated manner. The turn around time for generating a report containing the organized image files is substantially shortened.

Another advantage of the present invention is that the duplicates in the original data files can be eliminated. The size of the entire data files is substantially reduced.

A further advantage of the present invention is that the parallel processing of the data files allows the processing of the data files to be scalable.

An additional advantage of the present invention is that the converted image files are organized such that it allows readily further processing of the data files.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

The present invention discloses an efficient, automated data management system for logging, processing, and reporting a large volume of data capable of being in different types, stored on different media, and/or run by a different operating system.

FIGS. 1–6 illustrate one embodiment of a data management system 20 in accordance with the principles of the present invention. A data management system and methodology for a specific application are described later in detail as an example.

Figure 1:
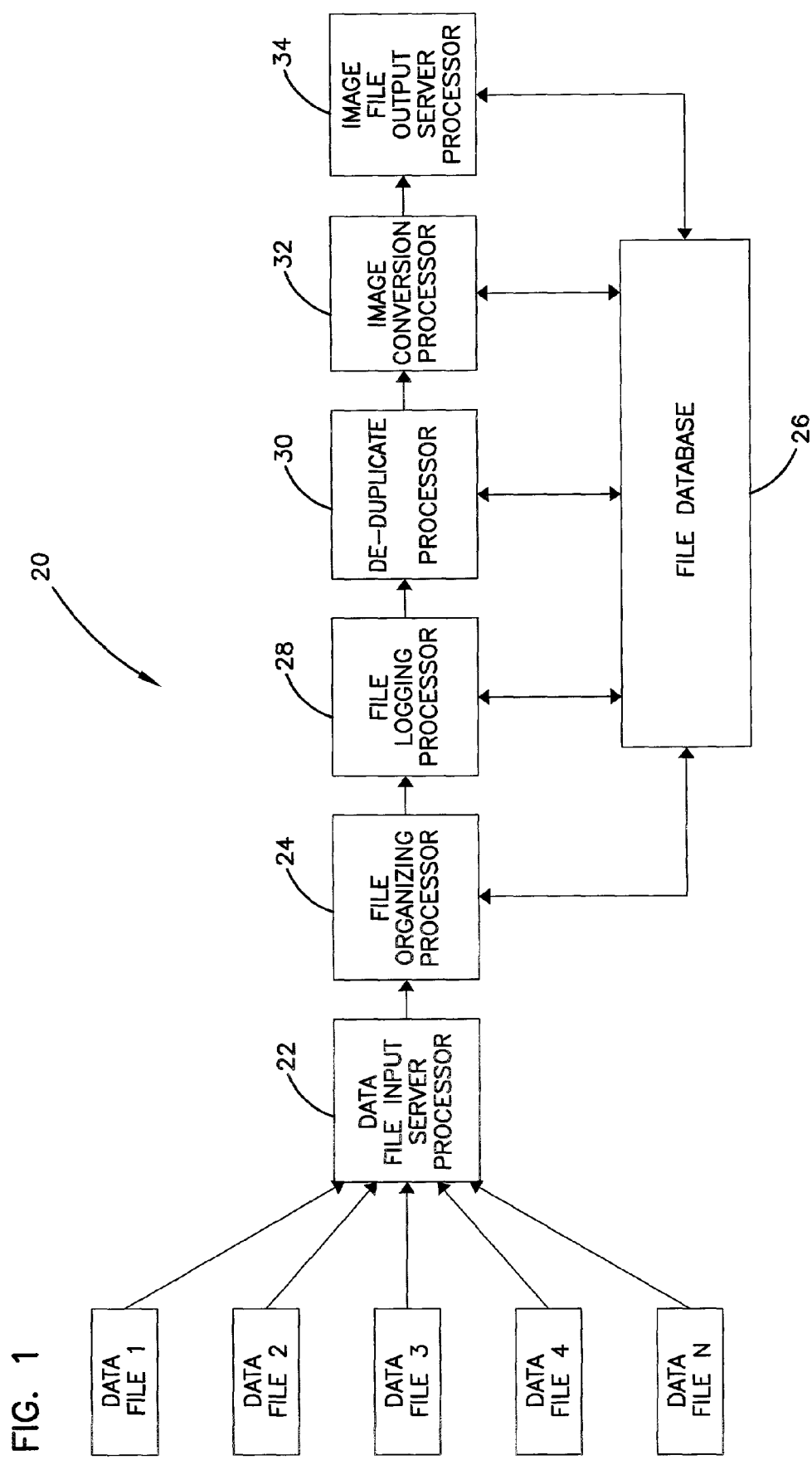
FIG. 1 illustrates a block diagram of one embodiment of a data management system in accordance with the principles of the present invention.

In FIG. 1, a plurality of data files N are imported into a data file input server processor 22. The data files are organized by a file organizing/categorizing processor 24 into a source directory structure and a destination directory structure. The data files are then logged into a file database 26 by a file logging processor 28. The file logging processor 28 identifies a file type of the data files and stores the file type information of the data files into the file database 26.

Also shown in FIG. 1, a de-duplicate processor 30 flags duplicates of the data files, i.e. de-duplicates the data files by creating a unique subset of data files by flagging duplicated files as such and storing this information the file database 26. Generally, the de-duplicate processor 30 calculates a SHA value of the received data files to determine whether the received data files have duplicates and flags duplicated data files in the file database 26. An image conversion processor 32 then converts the de-duplicated data files into image files, and an image file outputting server processor 34 exports the image files.

The details of logging, de-duplicating, and converting the data files and outputting the corresponding image files are discussed in operation flows shown in FIGS. 2–6.

Figure 2:
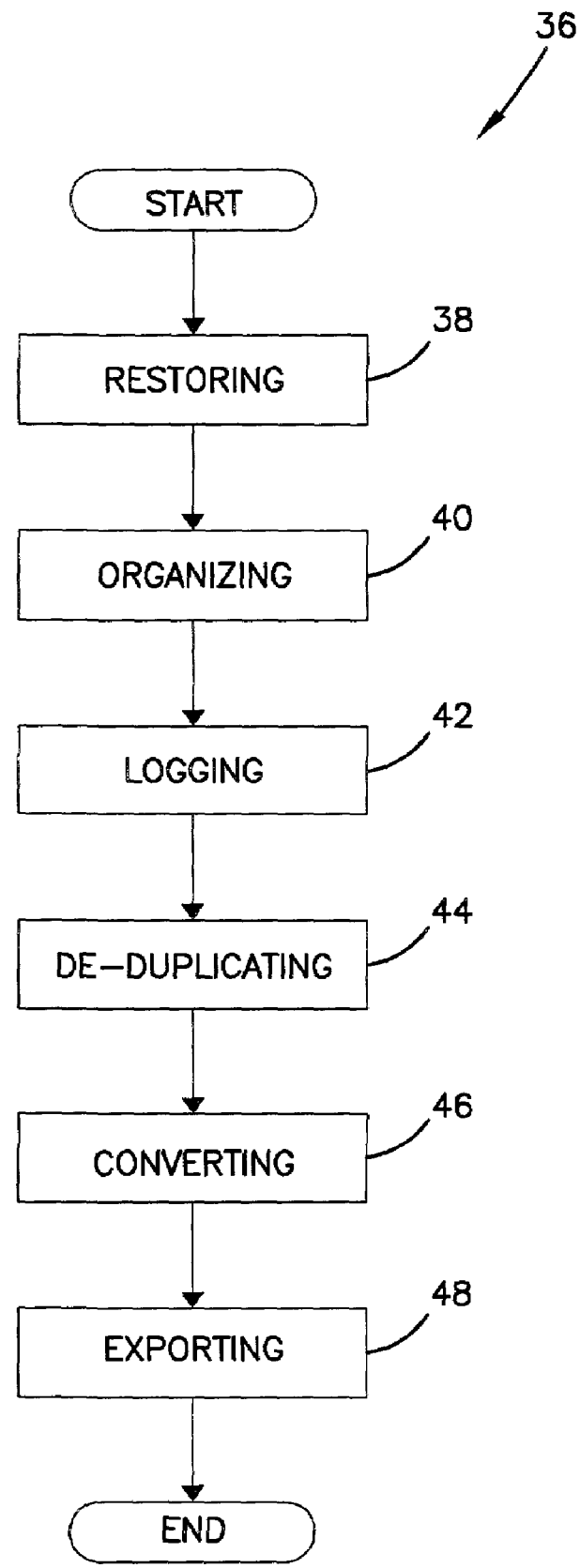
FIG. 2 illustrates a flow chart diagram of an exemplary operation of a data management method in accordance with the principles of the present invention.

FIG. 2 illustrates an operation flow 36 of an exemplary data management method in accordance with the principles of the present invention. The operation 36 starts with an operation 38 of restoring a plurality of received data files.

The data files can be of different file types. For example, the data files can be Word, JPEG, GIF, Bitmap, Excel, Access, Power Point, text, Adobe Acrobat, Paradox, ZIP files, etc. The data files are then organized, based on a predetermined user list, into a source directory structure and a destination directory structure in an operation 40. Next, in an operation 42, the received data files are logged into a file database formed by the source and destination directory structures. The operation 42 also identifies a file type of the received data files. Then, in an operation 44, the received data files are de-duplicated by calculating a SHA value of the received data files so as to determine whether the received data files have the same SHA value. If the data files have the same SHA value, then the data files are duplicates. If duplicates of the data files are found, they are flagged in the file database. The remaining de-duplicated data files are then converted into image files in an operation 46. Next, the converted image files are exported to a printer or a viewer, etc.

Figure 3:
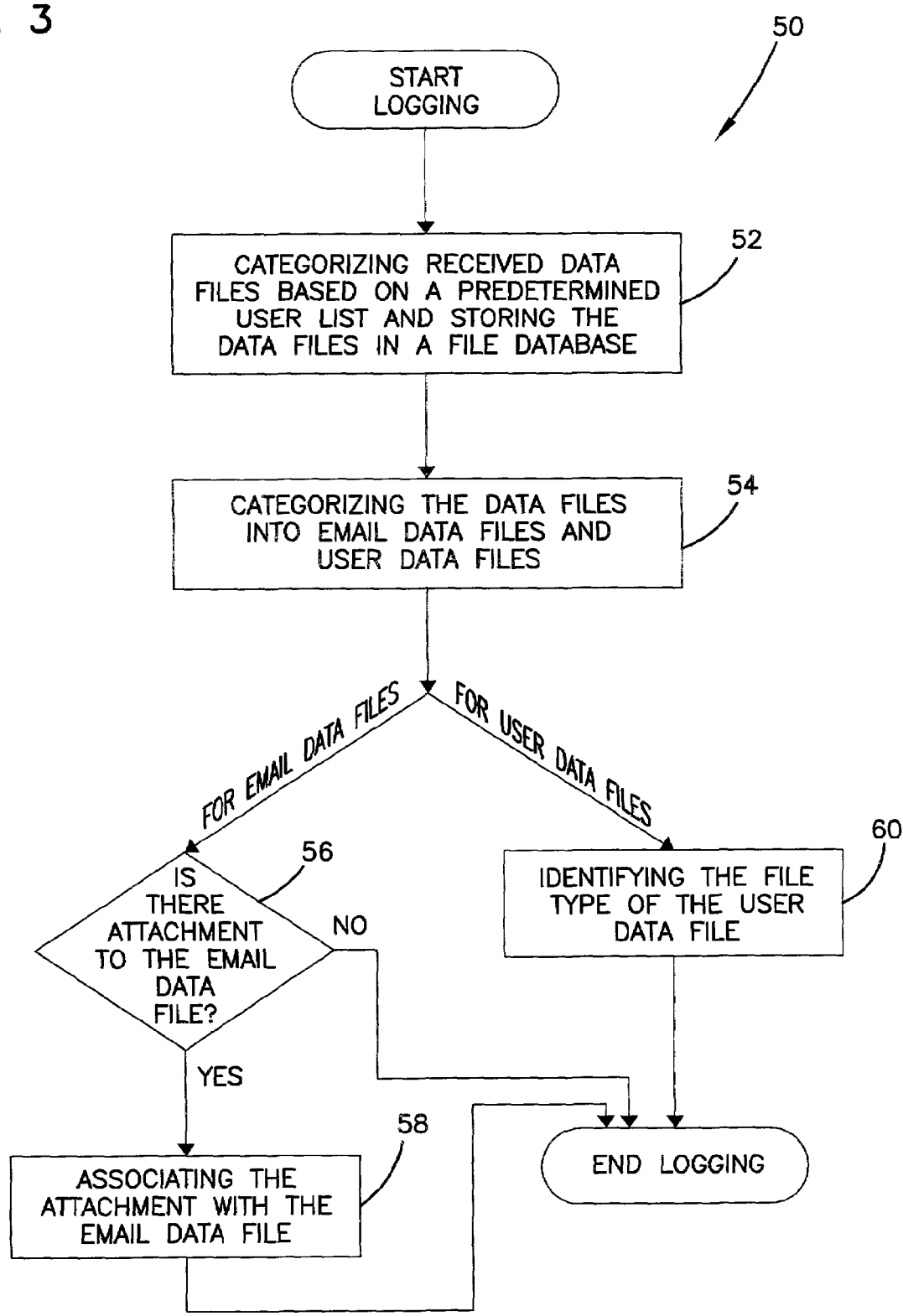
FIG. 3 illustrates a flow chart diagram of an exemplary logging data file operation in accordance with the principles of the present invention.

FIG. 3 illustrates an operation flow 50 of logging data files in accordance with the principles of the present invention. The logging data file operation 50 starts with an operation 52 of categorizing the received data files based on a predetermined user list and storing the data files in a data structure under a user directory. Then, the data files are categorized into email data files and user data files in an operation 54. For the email data files, an operation 56 determines whether there is an attachment to an email data file. If there is an attachment to an email data file, i.e. the "Yes" path, then the attachment is associated with the email data file in an operation 58 so that the image files of the attachment can be reviewed with the image files of the email data files. The attachment is then further categorized in the operation 54. If there is no attachment to an email data file, i.e. the "No" path, then the logging data file operation 50 ends. For the user data files, on the other hand, the file type of the user data files is identified in an operation 60. For example, the data files having a Word format are distinguished from the data files having an Excel format. The data files having the same file type can be grouped and stored together in a database structure so that they can be processed together. Then, the logging data file operation 50 ends.

Figure 4:
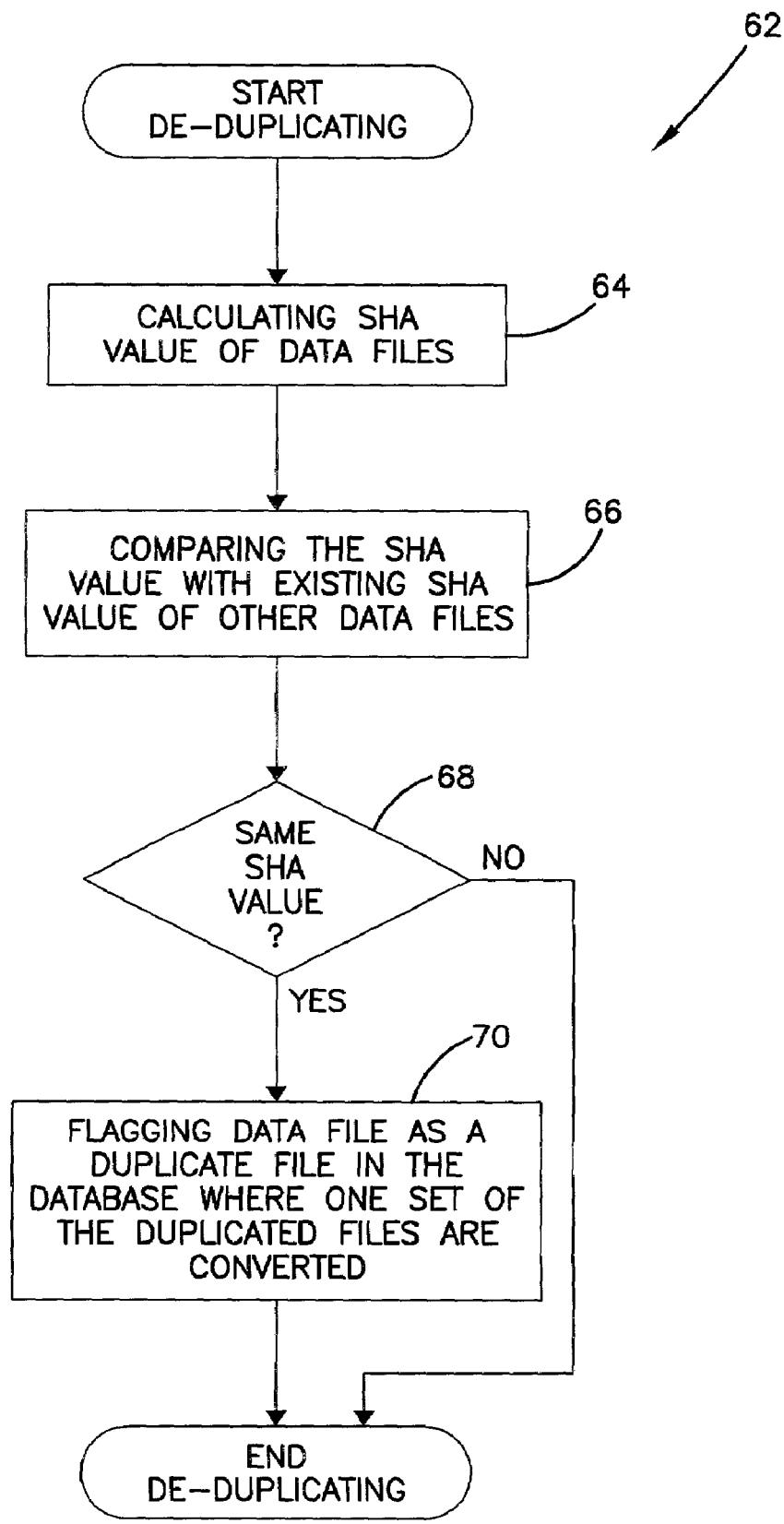
FIG. 4 illustrates a flow chart diagram of an exemplary de-duplicating data file operation in accordance with the principles of the present invention.

FIG. 4 illustrates an operation flow 62 of de-duplicating data files in accordance with the principles of the present invention. The de-duplicating data file operation 62 starts with an operation 64 of calculating a SHA value for each of the data files. Then, in an operation 66, the SHA values of the data files are compared. If the data files have the same SHA value from an operation 68, i.e. the "Yes" path, one of the duplicated data files is retained in the file database, and the other duplicated data files are flagged in the file database in an operation 70. Then, the operation 62 ends. If the data files do not have the same SHA values, the operation 62 ends.

Figure 5:
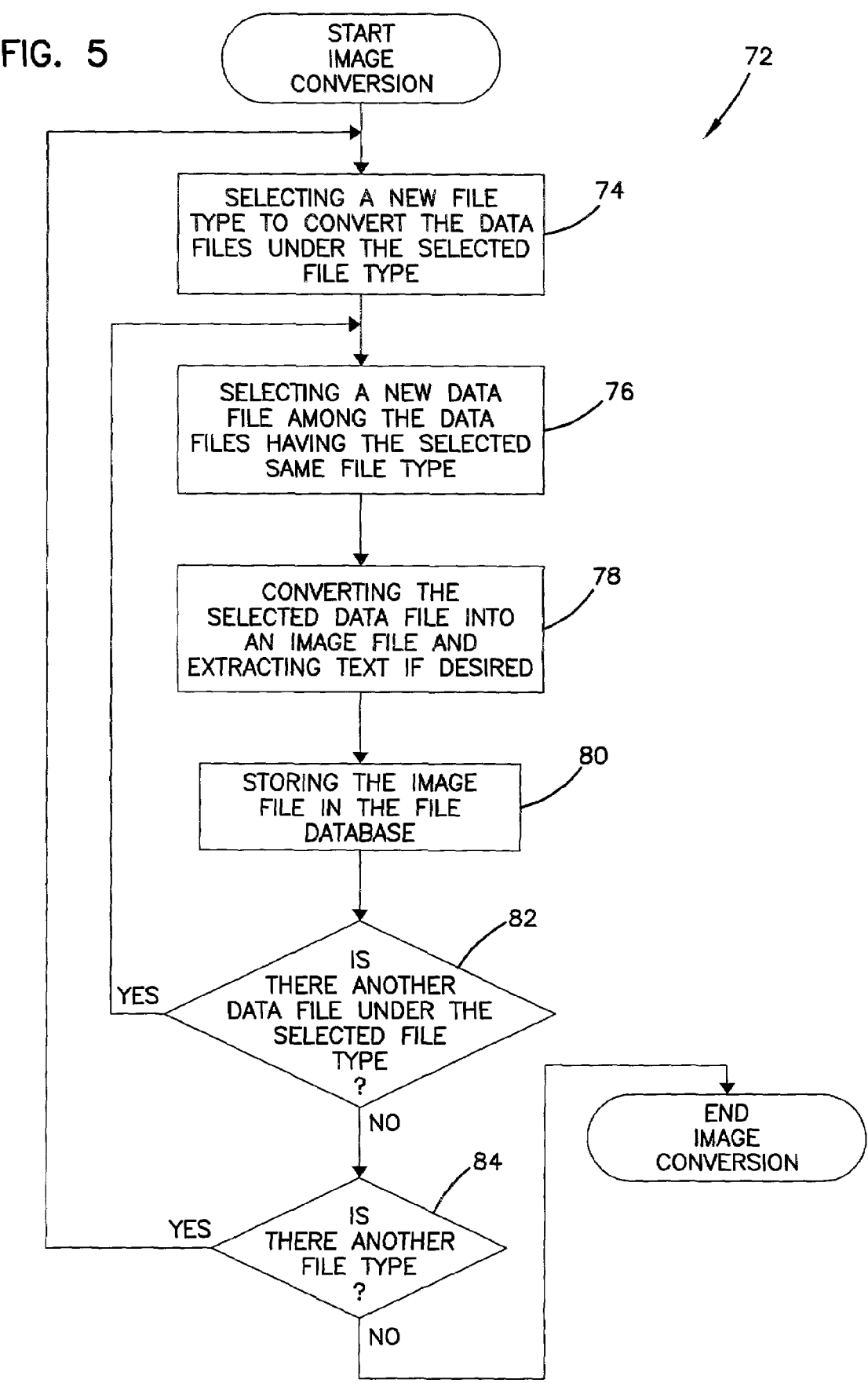
FIG. 5 illustrates a flow chart diagram of an exemplary image conversion operation in accordance with the principles of the present invention.

FIG. 5 illustrates an operation flow 72 of image conversion in accordance with the principles of the present invention. The image conversion operation 72 starts with an operation 74 of selecting a new file type to convert the data files under the selected file type into image files. Next, a new data file among the data files having the same file type is selected in an operation 76. Then, the selected data file is converted into an image file in an operation 78. Next, the image file is stored in the file database to be reviewed in an operation 80. If an operation 82 determines that there is another data file under the selected file type, then the operation flow 72 goes back to the operation 76 to select a new data file. If the operation 82 determines that there is no other data file under the selected file type, then the operation flow 72 goes to an operation 84 to determine whether there is another file type. If there is another file type in an operation 84, then the operation flow 72 goes to the operation 74 to select a new file type. If there is no other file type in the operation 84, the operation flow 72 is terminated.

Figure 6:
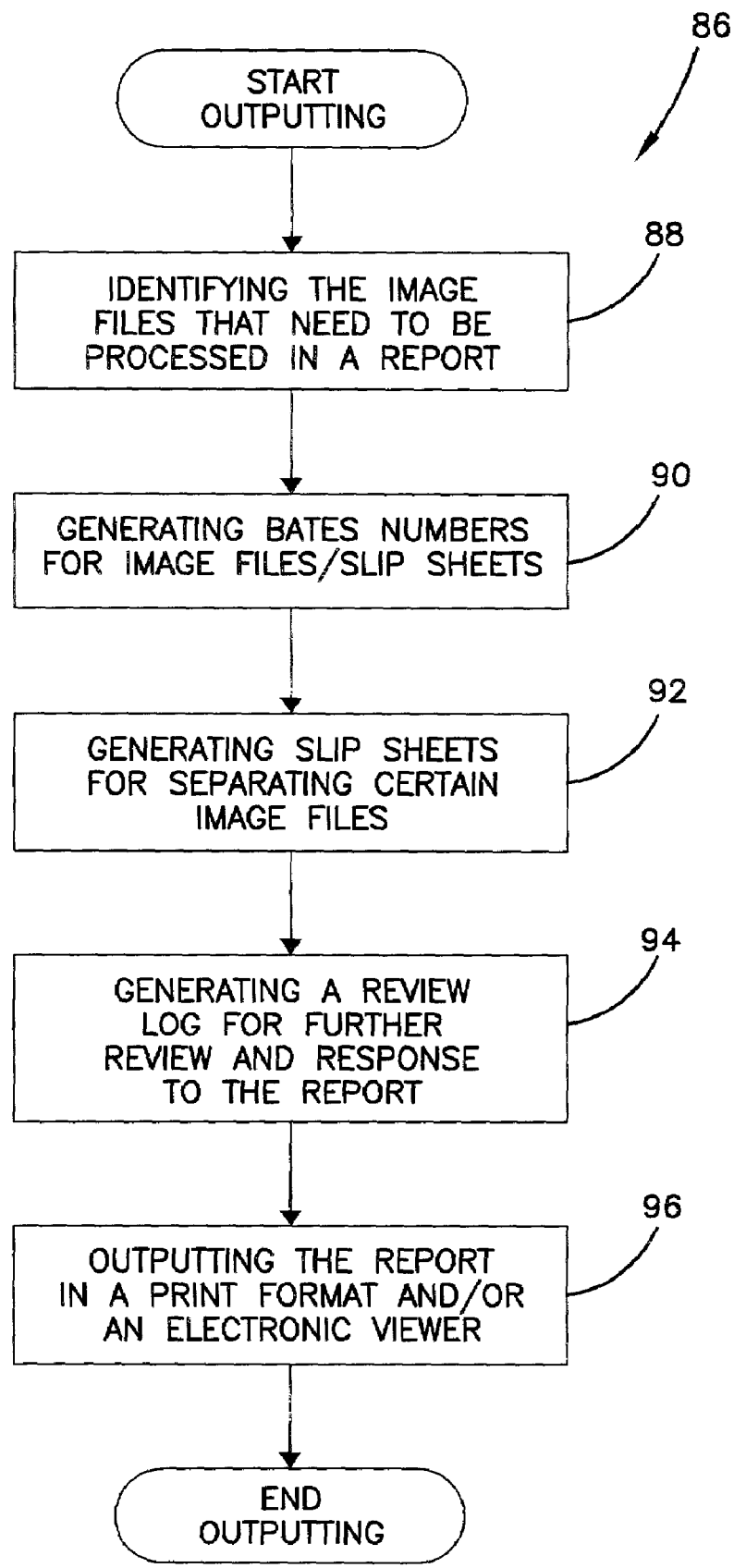
FIG. 6 illustrates a flow chart diagram of an exemplary outputting image file operation in accordance with the principles of the present invention.

FIG. 6 illustrates an operation flow 86 of outputting image files in accordance with the principles of the present invention. The outputting image file operation 86 starts with an operation 88 of identifying the image files that need to be processed in a report. Then, bates numbers for image file/slip sheets are generated in an operation 90. Next, slip sheets are generated to separate certain image files in an operation 92. Then, a review log is generated for further review and response to the report in an operation 94. Next, the report is outputted in a print format and/or an electronic viewer in an operation 96. Then, the operation flow 86 is terminated.

It is appreciated that the sequence or order of the operation flows 36, 50, 62, 72, and 86 can be varied within the scope of the present invention. Also, it is appreciated that some steps in the operation flows 36, 50, 62, 72, and 86 can be added, merged, and/or eliminated depending on a customer's needs without departing from the scope of the present invention.

The data management system and methodology for a specific application in accordance with the principles of the present invention described below is just an example. The specific application of the data management system and method includes a pre-processing/data massaging step and three phases of data processing.

Pre-processing/Data Massaging Step

The pre-processing/data massaging step includes storing and restoring data from any media, file system, or backup system. It is appreciated that the pre-processing/data messaging step may also include recovering corrupted data if the data on the media, file system, or backup system is corrupted, lost, or damaged.

The original data files can be received via email, mail, the Internet, or any other network or server systems. Also, the original data files can be obtained on-site via backups. Further, the data files can be in any form or on any media, for example, backup tapes, hard drives, floppies, CDs, opticals, etc. The data files can be extracted from any file system including UNIX, NOVELL, NT, DOS, etc.

The received data files are then copied and moved into an appropriate database structure. The directory structure is based on a master user list, e.g. a folder or directory and subsequent sub-directories, etc. The data files can be converted into a standard format, such as Group Wise, Lotus Notes, Microsoft format if desired. The data files can also be broken up into sub-categories, such as email data files and user data files. Accordingly, all email data files, such as personal folders and email messages, are moved to a special directory for a specific user. Then, sub-directories, such as location or time-slice, are used to better delineate the data files. For example, the directory and sub-directories are created for Joe Smith's email as: Source\Minneapolis\Email\9-12-88\Joe Smith\.

Meanwhile, an example of a destination directory and sub-directories for storing image files for an output report is created for Joe Smith's email as: Destination\Minneapolis\Email\9-12-88\Joe Smith\.

Accordingly, with the source and destination directories and sub-directories, the breaking up of the received data files is used to help process Joe Smith's and others' data files.

Five Phases of Data Processing

The five phases of data processing include Logging/Extracting (Phase 1), Processing/Tiffing (Phase 2), Reporting/Exporting (Phase 3), Delivery/Printing (Phase 4), and Review/Second Print (Phase 5). The use of five phases allows one to control the quality and speed of data processing in each phase.

Data Cataloging And Information Logging—Phase 1

Phase 1 is to gather and log information about all data files. Based on a master list of users, i.e. the directories and sub-directories as described above, the directories corresponding to a user from the master list of users are selected. The master list of users can be stored as part of the database to increase automation. Since there is a master list of where each user's data is currently in the process, it prevents users from accidentally being double processed or skipped. It also allows for easy reporting on progress on the entire process as a whole. A list of file types to process is also used. Meanwhile, the master list is updated to indicate that this user is in Phase 1. The information on the selected source directories is uploaded directory by directory and file by file for processing. The following steps are implemented:

STEP 1:
Identifying the file type of both email and data file. One way to achieve that is to use a combination of file extensions and/or internal binary header information to determine the file type. Most files contain embedded binary data that can be used to identify the file regardless of the file extension. Accordingly, the determination of the file type is beyond the mere identifying the file extension, which could be misleading or limiting. This is a measure that prevents one from renaming a DOC, XLS, etc. to intentionally hide data or unintentionally omit data files. Also, this prevents any file type from not being processed if it is a file type being requested for processing.

STEP 2:
Figuring out if a data file is a duplicate or not. One way to achieve that is to use a SHA algorithm to determine a SHA value of a data file. SHA algorithm, i.e., Secure Hash Algorithm, was developed by the U.S. government to verify electronic transmissions of data between locations over fiber optic networks. The process analyzes and assigns a unique tag for each electronic document, based on the unique characteristics and patterns contained in the data. The SHA algorithm used in the present invention generates about 40 characters to identify a unique data file so as to determine whether there is a duplicate to the data file. If the two data files have the same SHA value, then the two data files are duplicates. Accordingly, the SHA value of a data file is compared to the existing SHA values in a database. If the SHA value has existed already, the data file is considered as a duplicate file. Accordingly, duplicated data files are flagged as duplicates and not converted into image files. Particularly in the litigation support area, removing duplicated data files saves review time by another person. Generally, this is no guarantee that two files are identical based solely on its file name, file dates, and file sizes. The method of generating SHA values for the data files in the present invention allows a mathematically certain process that prevents unique data from being overlooked and not processed.

One example of de-duplicating is that Email A has an Attachment B from User 1. User 1 emailed User 2 email A. User 2 now has a copy of both Email A and Attachment B. If neither user modified either the Email A or the Attachment B, they are identical on a binary level. Therefore, there may be no reason for one to review duplicated Email A and duplicated Attachment B since they are the same.

STEP 3:
Logging data files and information in the data and email files to a file database. One way to achieve that is to include information such as a date, subject, to, from, etc. from email messages, the child-parent relationships (e.g. the email and attachment relationship), duplicate, file type, etc.

STEP 4 (if email data files are being processed):
In case of email PSTs (Personal Folders), image files, such as tiff images, of the email messages are generated, and any attachments found within the email are extracted. Any extracted file is also processed (STEP 1 to STEP 3). All extracted files are stored in the destination directory of a file database.

STEP 5:
Each file goes through STEPS 1 through 4. Once all files have been logged, the master user list is updated to indicate that the user is done with Phase 1 and ready for Phase 2.

STEP 6:
Once all the data files are logged to the file database, quality checks and reports can be generated. This is one of the main reasons that the processing of data files is broken into several phases.

Document To Image Conversion—Phase 2

Phase 2 is the step where image files (e.g. Tiff format files) of the logged data files are generated.

Based on a master list of users, directories and sub-directories that correspond to a particular user are selected. The master list is then updated to indicate that the particular user is in Phase 2.

STEP 1:
File types are then selected to categorize the data files. File types may include PowerPoint, Access, Word, Write, Notepad, Excel, Graphic files (such as JGP, BMP, GIF, etc.), text, Rich Text Format, etc. The process identifies hundreds of file types using binary file header information.

STEP 2:
Going through the file database and locating the first data file that corresponds to the particular user selected and the file type selected. The steps of the tiffing process include:
1) Locating the next data or email file in the database associated to a user and the selected file type;
2) Opening the data or email file using automated techniques;
3) Converting the data or email file to an image file and storing the image file in the assigned user destination directory;
4) If required, extracting all the text from the data file into another file using automated techniques;
5) Closing the data file;
6) Logging information about the converted image file to the database;
7) Going back to step #1 for the next data or email file of the same file type previously selected

STEP 3:

When the data file is corrupted, encrypted, or unknown, opening and printing of the data file would indicate errors. The corrupted, encrypted or unknown data files are then repaired, decrypted, and/or recognized before being processed It is appreciated that information about the corruption can be logged. For example, a report can be automatically run to indicate what files are encrypted if passwords cannot be broken.

STEP 4:

Repeat STEPS 1 to 3 for all file types.

STEP 5:

Once there are no more data files that need to be converted into image files, the particular user is considered done for Phase 2, ready for Phase 3. The master list of users is updated to indicate this.

Report and Export Step—Phase 3

Phase 3 is to generate ordered output for a customer or a print shop. Based on a master list of users, the directories and sub-directories that correspond to a particular user are selected for processing in Phase 3. The master list is updated to indicate that the particular user is in progress for Phase 3. Based on files tiffed up (i.e. the image files) in Phase 2, a report can be generated which contains a listing of all tiffed files. These image files are arranged in a hierarchy relationship. For example, email data files are arranged to be associated with their attachments.

STEP 1:

Finding a next file that needs to be processed in the report.

STEP 2:

Assigning a bates number to each page of the image files generated in sequential order. For example, page one of the email data file has a bates number of 100000. The first four-page attachment has abates number of 100001 to 100004. The second three-page attachment has a bates number of 100005 to 100007. In general, bates numbers are sequential for a particular user's data files. Each user may start at a pre-defined jump point of Bates. For example, user 1 starts at 1 and has 5000 pages, user 2 starts at 100000 and has 34000 pages, and user 3 starts at 200000 and has 345 pages. In this example, the jump point for Bates is 100000. Each user's data is separated by 100000. This allows us to assign bates numbers sequentially and still process more than one user at a time. It also provides that no two pages are going to have the same Bates Number. The information about the bates number is stored in a file database for running reports and a second report or print if desired (see below).

STEP 3:

Generating slip sheets. Usually, a slip sheet can be a colored piece of paper to help differentiate document breaks. A slip sheet may be a Tiff file that contains information useful to a customer who reviews the report. A slip sheet may include a file name, a bates number, a date, a user name, an email folder, etc. A slip sheet may also contain any information gathered about the data file or information provided by a customer, such as company names, check boxes for review, etc.

STEP 4:

Creating a page-by-page review log for a second report or print if desired (see below). This page-by-page review log is a text file that is openable by EXCEL or ACCESS. The review log allows a customer to review the information to indicate responsive data files that need re-bates number for the tiffs for a final report or print.

STEP 5

Creating a print log. The print log is a simple text file that indicates the order that each image file or tiff file should be printed. The print log generally includes information such as location, tiff name, and other information for printing the report or print.

STEP 6

Repeating steps 1 to 4 for any attachment that an email might have. This keeps all email/attachment relationships in order.

STEP 7

Verifying the print log, line by line, to make sure that the information is valid and that the image file or tiff file exists

STEP 8

Once no files are left to bates stamp, the particular user from the master list is considered done for Phase 3, ready for deliver to a customer phase. The master list is updated to indicate this status.

Delivery of Report/Printing—Phase 4

Once the report is generated, the report can be delivered to a customer. It is appreciated that the delivery of the report can be in a paper print format or in an electronic viewer format. It is appreciated that other methods of delivery can be used without departing from the present invention. For example, the report or print can be delivered via emails, the Internet, etc., or hardware such as CDs, etc.

STEP 1

Shipping either a paper format of the processed documents, or the Tiffs being sent along with a log file that can be used to import into either an electronic viewer.

STEP 2

A customer reviews all the documents. Based on the review logged generated in Phase 3, the customer indicates what documents are responsive, e.g. responsive to a legal case in question. The review log is sent back to the data management system.

STEP 3

The review log information is uploaded into the database, and all files that are responsive are flagged.

Second Print/Document Removal-Phase 5

After a customer reviews the report generated, the customer may want to exclude and/or include some data files. The data files that are relevant are flagged. In this case, the data management system generates a new list of users and produces/prints only those image files that are flagged as relevant. A new set of sequential bates numbers are assigned. Slip sheets can be re-generated as described above if desired.

A process similar to Phase 3 is done here whereby only those documents that are marked as responsive are produced for print or export. A new set of bates numbers are assigned to the new subset of pages. All non-responsive documents are not considered for this re-print.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A data management system, comprising:
   a first server processor for receiving a plurality of received data files, the data files being capable of being different file types;
   a file organizing/categorizing processor for organizing the received data files, based on a predetermined list, into a source directory structure including at least one source directory, and a corresponding destination directory structure including a least one destination directory;
   a file logging processor for logging the received data files into a database formed by the source directory structure and identifying a file type of the received data files;
   a de-duplicate processor for calculating a value of the received data files to determine whether the received data files have duplicates and flagging duplicated data files in the database;
   a plurality of image conversion processors for converting the remaining, de-duplicated, data files into image files, respectively; and
   a second server processor for exporting the image files to the destination directory structure;
   wherein the file logging processor, the image conversion processors, and the second server processor are parallel processors such that the data files are parallel-processed in a data file logging stage, an image conversion stage, and an image file output stage; and
   wherein each of the image conversion processors is capable of converting the data files having the same file type into the corresponding image files.

2. The system of claim 1, wherein the image files are stored in the database to be viewed.

3. The system of claim 1, wherein the image files converted from the data files are in a tiff format.

4. The system of claim 1, wherein the data files include email data files and user data flies.

5. The system of claim 4, wherein the email data files are in a variety of formats including Microsoft Mail, Outlook, GroupWise, Lotus Notes, and the user data files have a variety of formats including Word, Excel, PowerPoint, and Access.

6. The system of claim 4, wherein the email data files include attachment data and email files.

7. The system of claim 6, wherein the attachment data and email files are associated with the email data files such tat the image data files for the email data files and the corresponding attachment data and email files can be viewed together.

8. The system of claim 1, wherein the data files having the same file type are converted into the image files together.

9. The system of claim 1, wherein the file logging processor identifies the file type of the data files based on information embedded in of each of the data files.

10. A data management method, comprising the steps of:
    receiving a plurality of received data files, the data files being capable of being different file types;
    organizing/categorizing the received data files, based on a predetermined list, into a source directory structure including at least one source directory, and a corresponding destination directory structure including at least one destination directory;
    logging the received data files into a database formed by the source directory structure and identifying a file type of the received data files;
    de-duplicating duplicates in the received data files by calculating a value of the received data files to determine whether the received data files have duplicates and flagging the duplicated data files in the database;
    converting the remaining data files into image files, respectively, using a plurality of image conversion processors, each of the image conversion processors being capable of converting the data files having the same file type into the corresponding image files;
    exporting the image files to the destination directory structure; and
    parallel processing the steps of logging, converting, and exporting such that the data files are parallel-processed in a data file logging stage, an image conversion stage, and an image file output stage.

11. The method of claim 10, further comprising the step of viewing the image files stored in the database.

12. The method of claim 10, wherein the converting of the data files includes tiffing the data files into the corresponding image files.

13. The method of claim 10, wherein the identifying of the data files includes identifying email data files and user data files, the email data files are in a variety of formats including Microsoft Mail, Outlook, GroupWise, Lotus Notes, the user data files have a variety of formats including Word, Excel, PowerPoint, and Access, and the email data files include attachment data and email files.

14. The method of claim 13, further comprising the step of associating the email data files with the corresponding attachment data and email files such that the image data files for the email data files and the corresponding attachment data and email files can be viewed together.

15. The method of claim 10, wherein the converting of the data files includes converting the data files having the same file type into the image files together.

16. The method of claim 10, wherein the identifying of the file type of the data files is based on information embedded in each of the data files.

* * * * *